Figure 1:
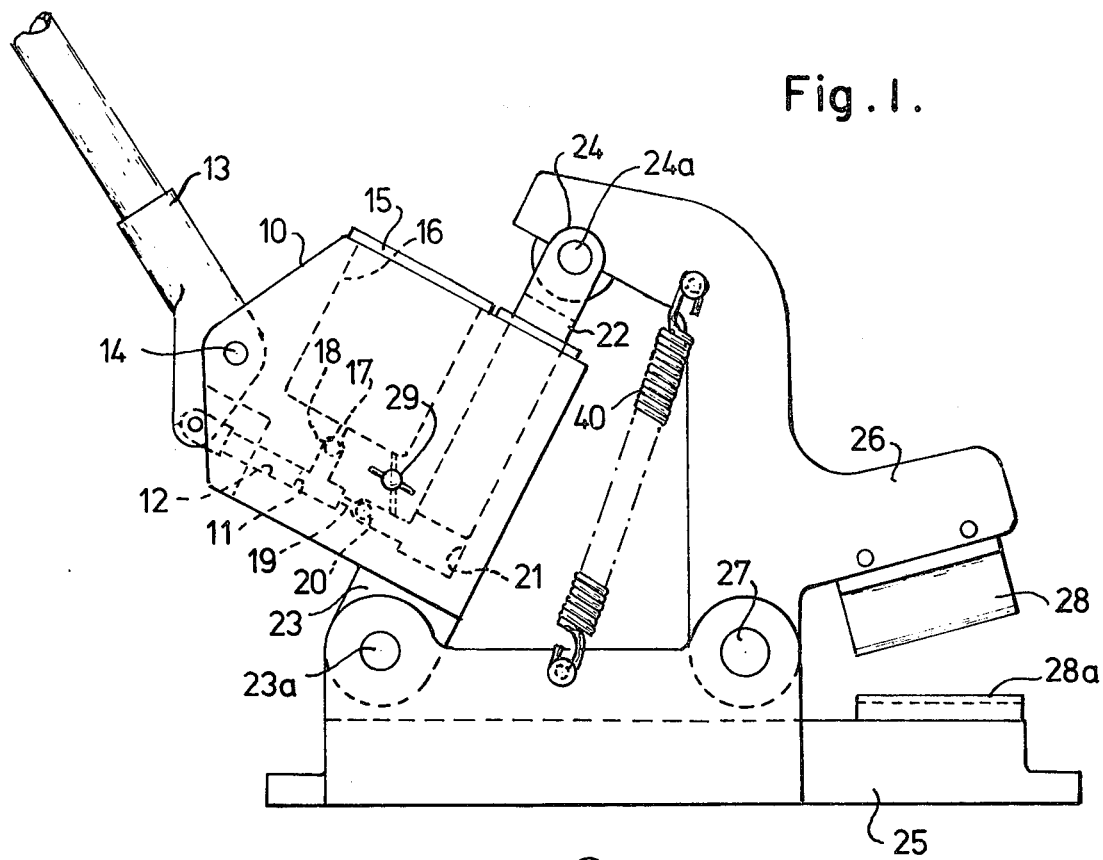

United States Patent [19]

Keigley

[11] 4,171,616
[45] Oct. 23, 1979

[54] HYDRAULIC EMERGENCY HAND TOOLS

[76] Inventor: Ronald E. Keigley, c/o The Keigley Tool Co, P.O. Box 86, Smithburg, W. Va. 26436

[21] Appl. No.: 917,193

[22] Filed: Jun. 20, 1978

[51] Int. Cl.² .............................................. F15B 15/18
[52] U.S. Cl. ...................................... 60/477; 60/478; 60/481; 30/180
[58] Field of Search ................ 60/477, 478, 481, 482; 30/180; 83/598, 601

[56] References Cited
U.S. PATENT DOCUMENTS

| 2,584,431 | 2/1952 | Dearsley | 60/478 X |
| 3,058,214 | 10/1962 | Mekler | 60/477 X |
| 3,819,153 | 6/1974 | Hurst et al. | 60/477 X |

Primary Examiner—Edgar W. Geoghegan
Attorney, Agent, or Firm—Buell, Blenko & Ziesenheim

[57] ABSTRACT

The specification discloses a hydraulic pressure operated emergency hand tool of the type in which manual pressure exerted on an all position small-area pump piston creates a hydraulic pressure which is communicated to a power cylinder for activating a plural jaw tool member, such as a pair of cutter blades. The jaw members are pivoted together intermediate their ends and one end of each is pivotally connected one to the power cylinder opposite the free end of the piston and the other to the free end of the piston. A release valve provides instant return displacement of hydraulic medium via a by-pass communication from the cylinder to the reservoir to relieve the activating pressure on the cutter blade and restore it promptly to normal position. Interchangeable tool members are provided.

6 Claims, 2 Drawing Figures

HYDRAULIC EMERGENCY HAND TOOLS

This invention relates to a hydraulic pressure operated emergency hand tool wherein the exertion of manual pressure on a pump piston communicates an amplified force via a hydraulic medium to a power cylinder for activating a jaw member, such as a cutter blade.

The need for an emergency hand tool capable of both cutting large section members such as the door columns of a wrecked vehicle and of opening a wedged vehicle door to extricate the occupants has long been recognized. Police departments, fire departments and emergency squads have long sought such a tool, however, no readily portable, inexpensive tool has been available for them. There are available certain devices which may be used for these purposes, however, these are generally very expensive and/or excessively bulky and difficult to handle.

Hand tools, in the form of pliers, presses, or cutters, utilizing a hydraulic medium for force amplification have long been known, as represented typically in U.S. Pat. No. 343,780, issued June 15, 1886, U.S. Pat. No. 2,096,574, issued Oct. 19, 1937; U.S. Pat. No. 2,979,032, issued Apr. 11, 1961. In the U.S. Pat. No. 2,979,932, a pair of cutter blades are arranged tong-like for activation by opposing pistons on which hydraulic pressure is built-up by manually effected oscillatory movement of a pump piston. Pressure on the opposing pistons may be relieved via a relief valve in by-pass of the pump piston.

In a more recent patent, U.S. Pat. No. 3,058,214, issued Oct. 16, 1962, a hydraulically operable hand tool utilizes a pivoted jaw member, such as a cutter blade, in cooperation with a stationary plate or jaw member. A pivoted handle is arranged, in cooperation with the cutter blade, to first mechanically move the cutter blade into contact with the object to be severed, and then exert pressure on a pump piston to transmit hydraulic pressure to a power cylinder for high-pressure activation of the cutter blade. Instant relief of activation pressure may be effected via a manually operated by-pass check valve.

Finally, applicant's earlier U.S. Pat. No. 3,788,173, issued Jan. 29, 1974, provides a cutter which has some elements of similarity to the present invention but is bulkier and has limited cutting ability limited by the type of jaw there provided.

The hand operated tools described in the foregoing patents, other than applicant's earlier patent, are of the one-hand type with limited capacity and unsuited, for example to sever large diameter multi-strand copper cable. In order to provide a hydraulic hand tool of adequate capacity and which avoids other disadvantages of the devices in the foregoing patents, I have provided a hydraulic emergency hand tool operable in all positions and in which the force exerted on a pair of pivoted jaws is constant and in which the jaws can be interchanged for different kinds of material to be cut or pried, as the case may be.

More specifically, I provide an all position manually operated hydraulic pump, a power cylinder receiving pressure fluid from said pump, a piston coaxial of said cylinder having a free end movable out of one end of said cylinder by fluid from said pump, reservoir means connected to said cylinder and pump, pivot means on each of the other end of said cylinder and the free end of said piston, release means between the cylinder and reservoir providing rapid return of fluid from the cylinder to the reservoir, means in the reservoir providing constant fluid feed to the pump in all positions, in combination first and second pair of jaw members pivoted intermediate their ends, one end of each jaw member of each pair being removably pivotally attachable to the pivot means on the piston and the other jaw member of each pair being pivotally attachable to the pivot means of said cylinder, the opposite ends of one pair being normally spaced apart one carrying an anvil and the other a cooperating blade and the opposite ends of the other pair being triangular in shape, coming to a point and being normally side by side.

Preferably I provide an interchangeable anvil member on said first pair of blades.

Figure 2:
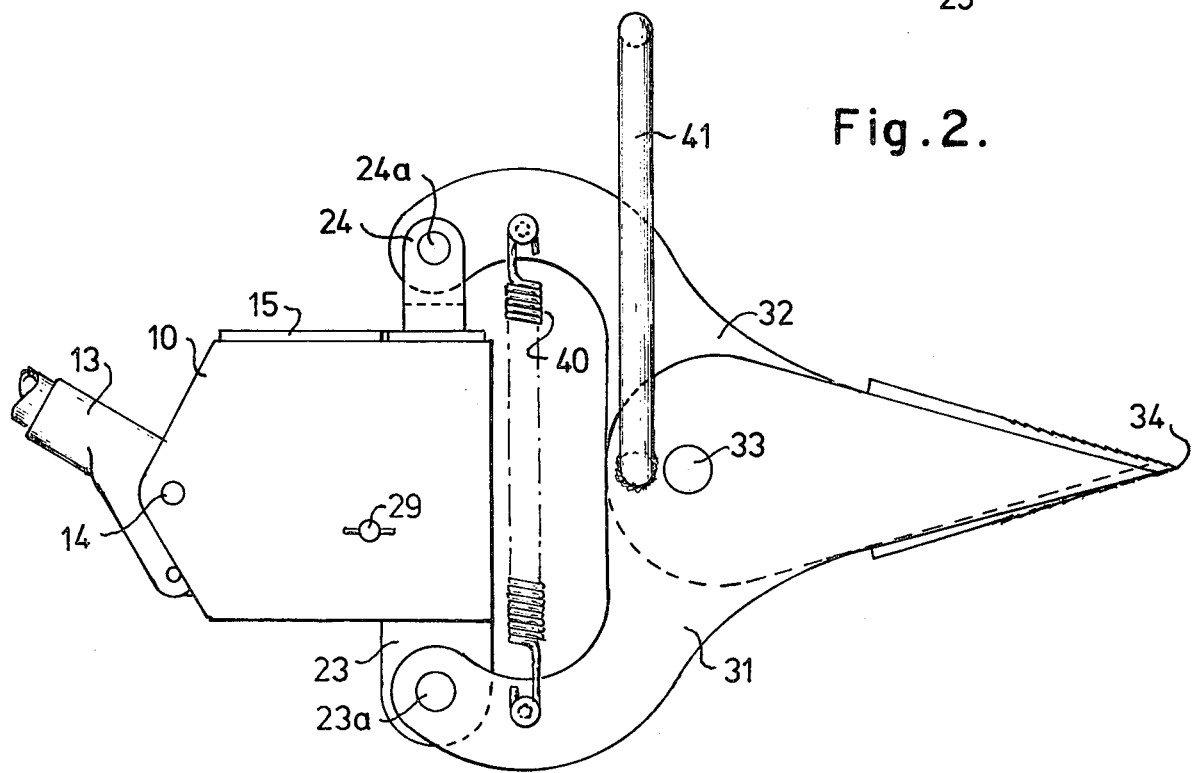

The above features and other features are hereinafter more specifically described in connection with the accompanying drawings wherein:

FIG. 1 is an elevational view of a preferred embodiment of a hydraulic emergency hand tool embodying one set of jaws according to my invention; and FIG. 2 is a side elevational view of the apparatus of FIG. 1 embodying a second interchangeable set of jaws according to my invention.

Referring to the drawings a preferred embodiment of hydraulic emergency hand tool with interchangeable jaws is illustrated. This tool comprises a housing 10 carrying a manually operated hydraulic pump in the form of a piston 11 movable in cylinder bore 12 by manually operable handle 13 pivoted to housing 10 on pivot pin 14. Fluid from reservoir 15 contained within bellows 16 is fed under very low positive pressure through check valve 17 in line 18 into bore 12 ahead of piston 11. When piston 11 is forced into bore 12, fluid is forced through line 19 and check valve 20 into bore 21 to force power piston 22 out of bore 21. Housing 10 is provided with downwardly projecting trunnions 23 and power piston 22 with upwardly projecting trunnions or clevis 24. A pair of jaw members 25 and 26 are pivoted together intermediate their ends by pivot pin 27. One end of jaw 25 is pivoted on trunnions 23 by quick release pin 23a and one end of jaw 26 is pivoted on trunnions 24 by quick release pin 24a. The quick release pins may have spring loaded retainer balls or simply spring catch ends of any well known form. The other end of jaw 25 is provided with a removable anvil 28a, while the other end of jaw 26 is provided with a removable blade 28. Jaw 26 is preferably made in the form of a bell crank so that the blade 28 is normally spaced apart from anvil 27. Operation of pump piston 11 to force fluid beneath power piston 22 causes the blade 28 to be forced against anvil 27 providing an extremely powerful cutting force capable, for example, of cutting through an automobile door column or windshield column. Fluid is returned from bore 21 by opening valve 29 in line 20 from bore 21 to reservoir 15. A second set of jaws 31 and 32 pivoted intermediate their ends on pin 33 is interchangeable with the first set of jaws 25 and 26 on trunnions 23 and 24. Jaws 31 and 32 are both generally bell crank shaped having one end of jaw 31 pivoted on trunnions 23 and one end of jaw 32 pivoted on trunnions 24. The other ends of the jaws are preferably identically shaped triangles lying side by side with a common pointed apex 34 which is adapted to be forced, for example, into the crack of a jammed vehicle door and then be opened out to force the door out of its frame so that trapped occupants can be extricated. Tension springs 40 are provided between each of jaws 23 and 24 and jaws 31 and 32 to cause them to assume their normal position with piston 22 fully seated in bore 21 and fluid all returned to reservoir 15 as soon as valve 29 is opened. When the piston 22 is fully seated in bore 21, valve 29 is closed and the apparatus is again ready for use with the jaws already in place or for interchange with the other set of jaws.

I may also add a U-shaped handle 41 to housing 10 or to one of the jaws as preferred for ease of handling.

It is at once evident that this tool is universally adaptable for cutting and prying open doors, frames, etc. to make it possible to extricate trapped persons. It is also evident that the tool is simple, light in weight and relatively inexpensive as compared with tools presently available for the purpose.

While I have illustrated and described a presently preferred embodiment, it will be understood that this invention may be otherwise embodied within the scope of the following claims.

I claim:

1. An emergency hand tool comprising an all position manually operated hydraulic pump, a power cylinder receiving pressure fluid from said pump, a piston coaxial of said cylinder having a free end movable out of one end of said cylinder by fluid from said pump, reservoir means connected to said cylinder and pump, pivot means on each of the other end of said cylinder and the free end of said piston, a pair of removable and interchangeable jaw members pivoted intermediate their ends pivotally connected at one end to the pivot means on the cylinder and piston whereby the other ends of said jaw members are moved relatively to one another, release valve means between the cylinder and reservoir providing rapid return of fluid from the cylinder to the reservoir and means in the reservoir providing constant fluid feed to the pump in all positions.

2. A hand tool as claimed in claim 1 wherein the interchangeable jaw members include a first pair of jaw members pivoted intermediate their ends, one end of each being removably connectible to the cylinder and piston and the other ends having one a cutter blade and the other an anvil, normally spaced apart and a second pair of jaw members pivoted intermediate their ends, one of each being removably connected to the cylinder and piston and the other ends being triangular in shape, coming to a point and normally side by side, said pairs of jaws being interchangeable on said cylinder and piston.

3. A hand tool as claimed in claim 2 wherein the blade and anvil of said first set of jaws are removable and replaceable.

4. A hand tool as claimed in claim 2 wherein the other ends of said second set of jaws are generally in the form of an isosceles triangle of generally small apex angle.

5. A hand tool as claimed in claim 4 wherein the said second set of jaws are of generally bell crank shape.

6. A hand tool as claimed in claim 1 wherein the said one end of each set of jaws is pivoted in the pivot means of the cylinder and piston by quick release pins.

* * * * *